(12) United States Patent
Birkenes

(10) Patent No.: US 11,867,848 B2
(45) Date of Patent: Jan. 9, 2024

(54) ULTRASONIC-BASED PERSON DETECTION SYSTEM AND METHOD

(71) Applicant: Neatframe Limited, Uxbridge (GB)

(72) Inventor: Øystein Birkenes, Uxbridge (GB)

(73) Assignee: Neatframe Limited, Uxbridge (GB)

( * ) Notice: Subject to any disclaimer, the term of this patent is extended or adjusted under 35 U.S.C. 154(b) by 0 days.

(21) Appl. No.: 17/762,034

(22) PCT Filed: Sep. 17, 2020

(86) PCT No.: PCT/EP2020/075976
§ 371 (c)(1),
(2) Date: Mar. 18, 2022

(87) PCT Pub. No.: WO2021/053071
PCT Pub. Date: Mar. 25, 2021

(65) Prior Publication Data
US 2022/0373666 A1     Nov. 24, 2022

(30) Foreign Application Priority Data

Sep. 20, 2019   (GB) ...................................... 1913590

(51) Int. Cl.
*G01S 7/536*     (2006.01)
*G01S 15/04*     (2006.01)
*G01S 15/52*     (2006.01)

(52) U.S. Cl.
CPC .............. *G01S 7/536* (2013.01); *G01S 15/04* (2013.01); *G01S 15/523* (2013.01)

(58) Field of Classification Search
None
See application file for complete search history.

(56) References Cited

U.S. PATENT DOCUMENTS 4,319,349 A * 3/1982 Hackett ................. G01S 15/523
                                                           367/136
9,319,633 B1 * 4/2016 Birkenes ............. H04L 65/4038
(Continued)

FOREIGN PATENT DOCUMENTS

CA       3179480 A1 * 11/2021 ........... H04B 1/3888
CN    208953911 U * 6/2019
(Continued)

OTHER PUBLICATIONS

International Search Report and Written Opinion for International Application No. PCT/EP2020/075976 dated Nov. 24, 2020.
(Continued)

*Primary Examiner* — Fekadeselassie Girma
(74) *Attorney, Agent, or Firm* — Wolf, Greenfield & Sacks, P.C.

(57) ABSTRACT

An ultrasonic-based person detection method. The method comprising the steps of: (a) emitting, from an emitter, an ultrasonic signal, the ultrasonic signal including a component at a first frequency; (b) receiving reflections of the ultrasonic signal, the received signal including components at frequencies greater than and less than the first frequency; (c) determining a difference between an upper portion of the received signal containing a frequency higher than the first frequency, and a lower portion of the received signal containing a frequency lower than the first frequency; and (d) determining, based on the difference between the upper portion and the lower portion, whether a person is present.

18 Claims, 8 Drawing Sheets

(56) References Cited

U.S. PATENT DOCUMENTS

| | | | |
|---|---|---|---|
| 9,848,167 B1* | 12/2017 | Christian | H04N 7/142 |
| 10,574,941 B2* | 2/2020 | Ahn | H04N 5/2628 |
| 10,706,696 B1* | 7/2020 | Pachikov | G08B 13/196 |
| 2006/0033597 A1* | 2/2006 | Wells | G08B 25/12 |
| | | | 333/204 |
| 2006/0261931 A1* | 11/2006 | Cheng | G06V 40/45 |
| | | | 340/5.53 |
| 2007/0128899 A1* | 6/2007 | Mayer | G06F 9/4406 |
| | | | 439/152 |
| 2008/0099549 A1* | 5/2008 | Bryan | H04W 52/0216 |
| | | | 235/375 |
| 2008/0157510 A1* | 7/2008 | Breed | E05F 15/43 |
| | | | 701/45 |
| 2015/0029026 A1* | 1/2015 | Brandes | G08B 21/0266 |
| | | | 340/571 |
| 2018/0067502 A1* | 3/2018 | Chi-Hsueh | B64D 47/08 |
| 2021/0150869 A1* | 5/2021 | Deutsch | G08B 13/248 |
| 2022/0039619 A1* | 2/2022 | Barr | A47K 13/06 |

FOREIGN PATENT DOCUMENTS

| | | | |
|---|---|---|---|
| CN | 114805644 B | * | 9/2022 |
| EP | 0 494 439 A2 | | 7/1992 |
| EP | 0494349 A2 | * | 7/1992 |

OTHER PUBLICATIONS

International Preliminary Report on Patentability for International Application No. PCT/EP2020/075976 dated Mar. 31, 2022.
Granjon, The CuSum algorithm—a small review. HAL. Mar. 2014. 23 pages.
Kay, Fundamentals of statistical signal processing. detection theory, vol. ii. Prentice Hall PTR. 1998. 546 pages.

* cited by examiner

ULTRASONIC-BASED PERSON DETECTION SYSTEM AND METHOD

RELATED APPLICATIONS

This Application is a National Stage filing under 35 U.S.C. § 371 of International Application Serial No. PCT/EP2020/075976, filed Sep. 17, 2020, which claims the benefit of priority to GB application number 1913590.4, filed Sep. 20, 2019, each of which is herein incorporated by reference in its entirety.

FIELD OF THE INVENTION

The present invention relates to an ultrasonic person detection system and method.

BACKGROUND

Video conferencing devices, such as collaboration endpoints, typically have a standby state which is meant to be active when the device is not in use. Beneficially, the standby state reduces power consumption, for example by turning off components not required (e.g. monitors). Another benefit of a standby state is the increase in life expectancy of components such as camera sensors, projector bulbs etc.

A device having a standby state must have a way of placing the device in the standby state, and waking it up again. For example, previous video conferring devices have operated on a timer and person input method. The device is programmed to go into standby mode after a predetermined period of inactivity (e.g. 10 minutes), and is woken by person input to a control panel or similar. However this is not particularly intuitive to some users, particularly if the control panel is not easily accessible or hidden from view.

It is also known to use a person detector, where the device is placed in standby mode when it determines that nobody is nearby. One such example is disclosed in U.S. Pat. No. 9,319,633 B1, in which ultrasound is transmitted into a spatial region. A controller then receives reflected ultrasound, and computes an error signal representative of an estimate of an echo-free received ultrasonic signal. The controller then computes power estimates of the error signal over time, and detects the presence of people based on a change of this power estimate.

However, an issue with the ultrasonic method discussed above, is that it can be prone to false positives. The system discussed above detects over a relatively narrow frequency range. However transient noises not produced by the emitter, for example, the closing of a door or clapping of hands, are relatively broadband in frequency and so will have a component falling within the detection range. This can lead to false positives, in which a transient noise detected near to the device (but not indicative of a person being present in the room) causes the device to wake up from standby mode.

There is a need then for a more robust person detection method, which is less prone to false positives.

SUMMARY

Accordingly, in a first aspect, embodiments of the present invention provide an ultrasonic-based person detection method, comprising the steps of:

(a) emitting, from an emitter, an ultrasonic signal, the ultrasonic signal including a component at a first frequency, $f_0$;

(b) receiving reflections of the ultrasonic signal, the received signal including components at frequencies greater than and less than the first frequency;

(c) determining a difference between an upper portion of the received signal containing a frequency higher than the first frequency, and a lower portion of the received signal containing a frequency lower than the first frequency; and (d) determining, based on the difference between the upper portion and the lower portion, whether a person is present.

Such a method is more robust in detecting whether a person is actually present, by mitigating against false positives caused by broadband noises not indicative of movement. The method is also more robust with regards to other devices which may emit ultrasonic signals at $f_0$ in close proximity. Further, the method does not rely on the emitter and receiver being temporally synchronized.

The method may have any one, or any combination insofar as they are compatible, of the following optional features.

The determination may be based on a difference between the upper frequency portion and the lower frequency portion.

The upper portion of the received signal may contain higher frequencies immediately adjacent to the first frequency, and the lower portion of the received signal may contain lower frequencies immediately adjacent to the first frequency.

The method may include dividing the received signal into a plurality of bins, each bin representing a range of frequencies in the received signal, and wherein the upper portion is an upper frequency bin, containing portions of the received signal which are higher in frequency than the first frequency, and the lower portion is a lower frequency bin, containing portions of the received signal which are lower in frequency than the first frequency.

The determination may be performed based on a difference between a normalised power estimate of the upper frequency bin and a normalised power estimate of the lower frequency bin. The normalisation factor may be the sum of the power estimates of the upper frequency bin and the lower frequency bin. The normalisation may be performed by subtracting an estimate of the mean of the upper frequency bin and the lower frequency bin.

Determining the presence of a person may include determining a logit function of a normalised power of the upper frequency bin. Determining the presence of a person may include determining a logit function of a normalised power of the lower frequency bin. Determining the presence of a person may include determining a first logit function of a normalised power of the upper frequency bin, and determining a second logit function of a normalised power of the lower frequency bin.

The logit function may take the form:

$$L(t) = \mathrm{logit}\left(\frac{|X(t, f_0+1)|^2}{|X(t, f_0-1)|^2 + |X(t, f_0+1)|^2}\right)$$

where $X(t, f_0+1)$ is a coefficient representing the upper frequency bin at time $t$, and $X(t, f_0-1)$ is a coefficient representing the lower frequency bin at time $t$.

Steps (b)-(d) may be repeated at a predetermined rate. Each repetition of (b)-(d) may be performed on a time-window of received signal. The time-window may be around 20 ms.

After it has been determined that a person is present, the method may further comprise a step of determining whether the person is moving towards or away from the receiver. Determining whether the person is moving towards or away from the receiver may be further based on a first likelihood ratio test, for determining whether the person is moving towards the receiver, and a second likelihood ratio test, for determining whether the person is moving away from the receiver. A log-likelihood ratio may be derived for each likelihood ratio, and may be computed recursively from a previous value of the respective log-likelihood ratio. Advantageously, such log-likelihood ratios are simpler to implement and may have a lower computational complexity, resulting in a computationally cheaper method.

When it has been determined that a person is present, the method may include taking a video conferencing device out of standby mode.

In some embodiments, there may be a first receiver and a second receiver, wherein the first receiver receives reflections of the ultrasonic signal having components greater in frequency than the first frequency and the second receiver receives reflections of the ultrasonic signal having components lower in frequency than the first frequency. The first receiver may, therefore, receive the upper portion of the received signal, and the second receiver may receive the lower portion of the received signal. Determining the difference between the upper portion of the received signal and the lower portion of the received signal may include determining whether the first receiver and/or second receiver received a respective signal. Where both of the receivers received a signal, it may be determined that the received signal is a false positive. Where only one receiver receives a signal, it may be determined that a person is present.

In a second aspect, embodiments of the present invention provide a system for detecting a person, the system including:
  an emitter, configured to emit an ultrasonic signal including a component at a first frequency, $f_0$;
  one or more receivers, configured to receive reflections of the ultrasonic signal; and
  one or more processors, configured, in response to the receiver receiving a received signal including components at frequencies greater than and less than the first frequency, to:
    (a) determine a difference between an upper portion of the received signal containing a frequency higher than the first frequency, and a lower portion of the received signal containing a frequency lower than the first frequency; and
    (b) determine, based on the difference between the upper portion and the lower portion, whether a person is present.

Such a system is more robust in detecting whether a person is actually present, by mitigating against false positives caused by broadband noises not indicative of movement. The system is also more robust with regards to other devices which may emit ultrasonic signals at $f_0$ in close proximity. Further, the system does not rely on the emitter and receiver being temporally synchronized.

The system may have any one, or any combination insofar as they are compatible, of the following optional features.

The determination may be based on a difference between the upper portion of the received signal and the lower portion of the received signal.

The upper portion of the received signal may contain higher frequencies immediately adjacent to the first frequency, and the lower portion of the received signal may contain lower frequencies immediately adjacent to the first frequency.

The processor(s) may be further configured to divide the received signal into a plurality of bins, each bin representing a range of frequencies in the received signal, and wherein the upper portion is an upper frequency bin, containing portions of the received signal which are higher in frequency than the first frequency, and the lower portion is a lower frequency bin, containing portions of the received signal which are lower in frequency than the first frequency.

The determination may be performed based on a difference between a normalised power estimate of the upper frequency bin and a normalised power estimate of the lower frequency bin. The normalisation factor may be the sum of the power estimates of the upper frequency bin and the lower frequency bin.

Determining the presence of a person may include determining a logit function of a normalised power of the upper frequency bin. Determining the presence of a person may include determining a logit function of a normalised power of the lower frequency bin. Determining the presence of a person may include determining a first logit function of a normalised power of the upper frequency bin, and determining a second logit function of a normalised power of the lower frequency bin.

The logit function may take the form:

$$L(t) = \text{logit}\left(\frac{|X(t, f_0+1)|^2}{|X(t, f_0-1)|^2 + |X(t, f_0+1)|^2}\right)$$

where $X(t, f_0+1)$ is a coefficient representing the upper frequency bin at time t, and $X(t, f_0-1)$ is a coefficient representing the lower frequency bin at time t.

The processor may be configured to repeat steps (a)-(b) at a predetermined rate. Each repetition of (a)-(b) may be performed on a time-window of received signal. The time-window may be around 20 ms.

The processor may be further configured to determine, after it has been determined that a person is present, whether the person is moving towards or away from the receiver. Determining whether the person is moving towards or away from the receiver may be further based on a first likelihood ratio test, for determining whether the person is moving towards the receiver, and a second likelihood ratio test, for determining whether the person is moving away from the receiver. A log-likelihood ratio may be derived for each likelihood ratio, and may be computed recursively from a previous value of the respective log-likelihood ratio.

When it has been determined that a user is present, the processor may be configured to take a video conferencing device out of standby mode.

In some embodiments, there may be a first receiver and a second receiver, wherein the first receiver is configured to receive reflections of the ultrasonic signal having components greater in frequency than the first frequency and the second receiver is configured to receive reflections of the ultrasonic signal having components lower in frequency than the first frequency. The first receiver may, therefore, receive the upper portion of the received signal, and the second receiver may receive the lower portion of the received signal. Determining the difference between the upper portion of the received signal and the lower portion of the received signal may include determining whether the first receiver and/or second receiver received a respective signal. Where both of the receivers received a signal, it may be determined that the received signal is a false positive. Where only one receiver receives a signal, it may be determined that a person is present.

Further aspects of the present invention provide: a computer program comprising code which, when run on a computer, causes the computer to perform the method of the first aspect; a computer readable medium storing a computer program comprising code which, when run on a computer, causes the computer to perform the method of the first aspect; and a computer system programmed to perform the method of the first aspect.

The optional features of the aspects of the invention set out above are applicable singly or in any combination with any aspect of the invention.

BRIEF DESCRIPTION OF THE DRAWINGS

Embodiments of the invention will now be described by way of example with reference to the accompanying drawings in which.

Figure 5:
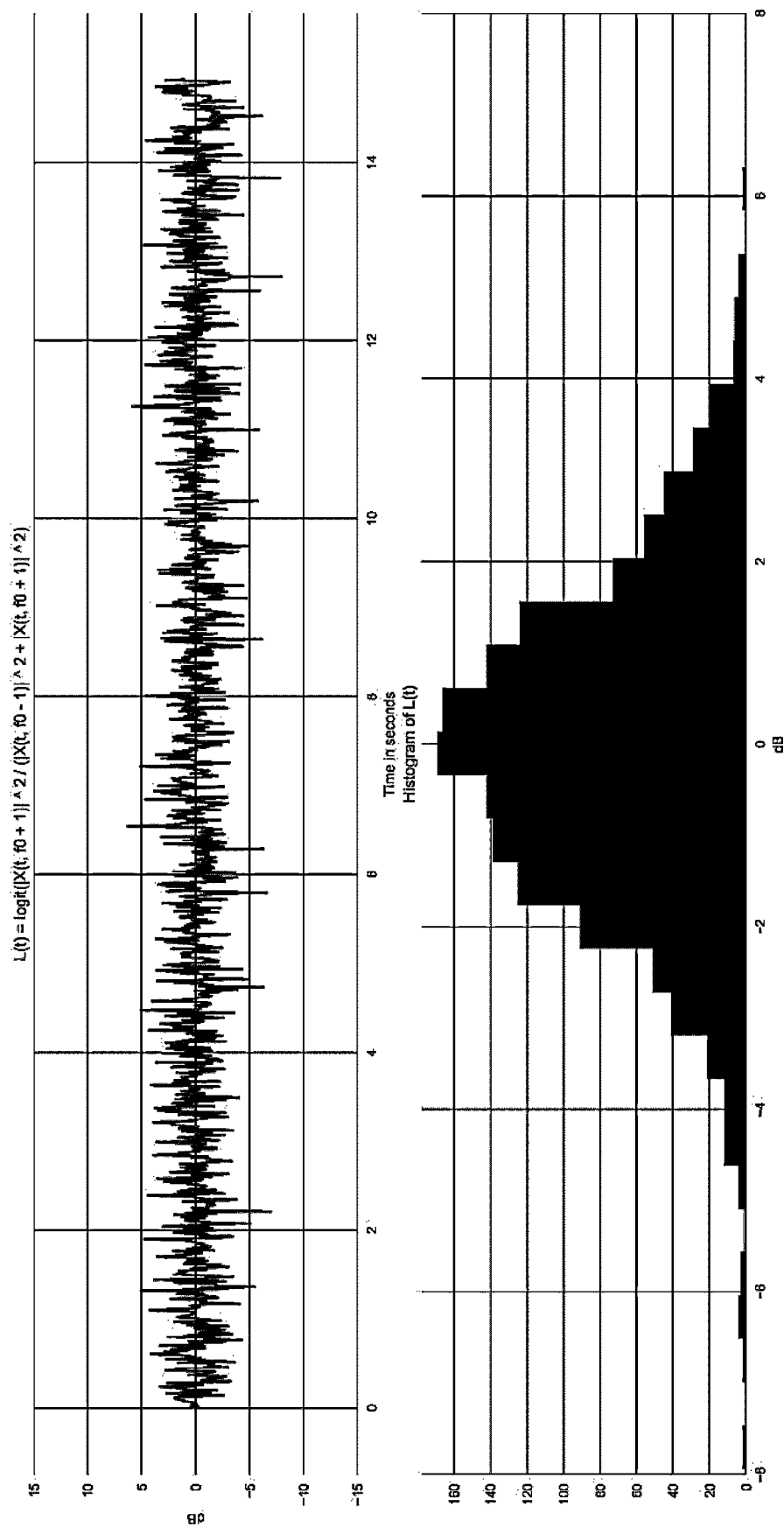
Figure 6:
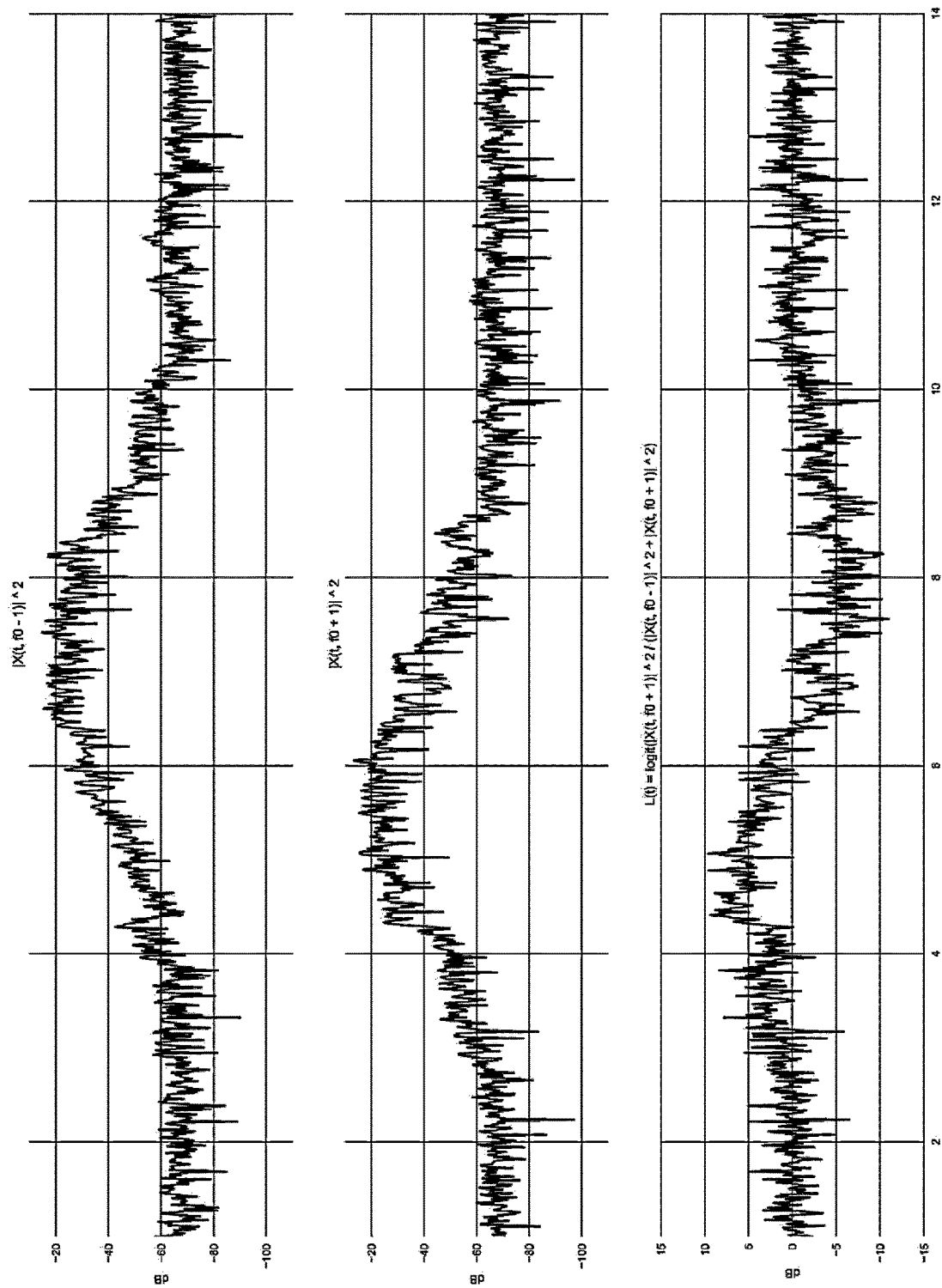
Figure 7:
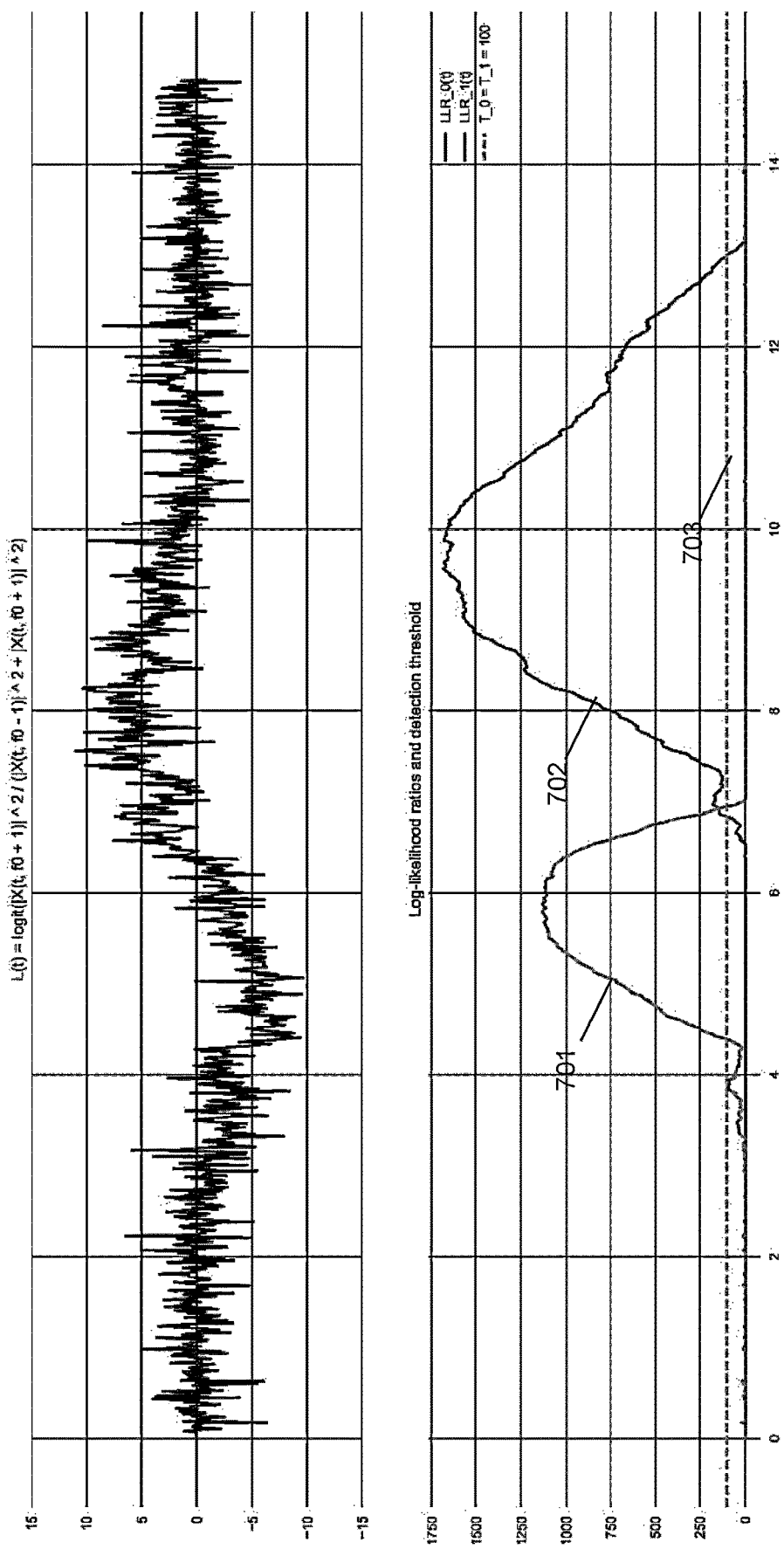
Figure 8:
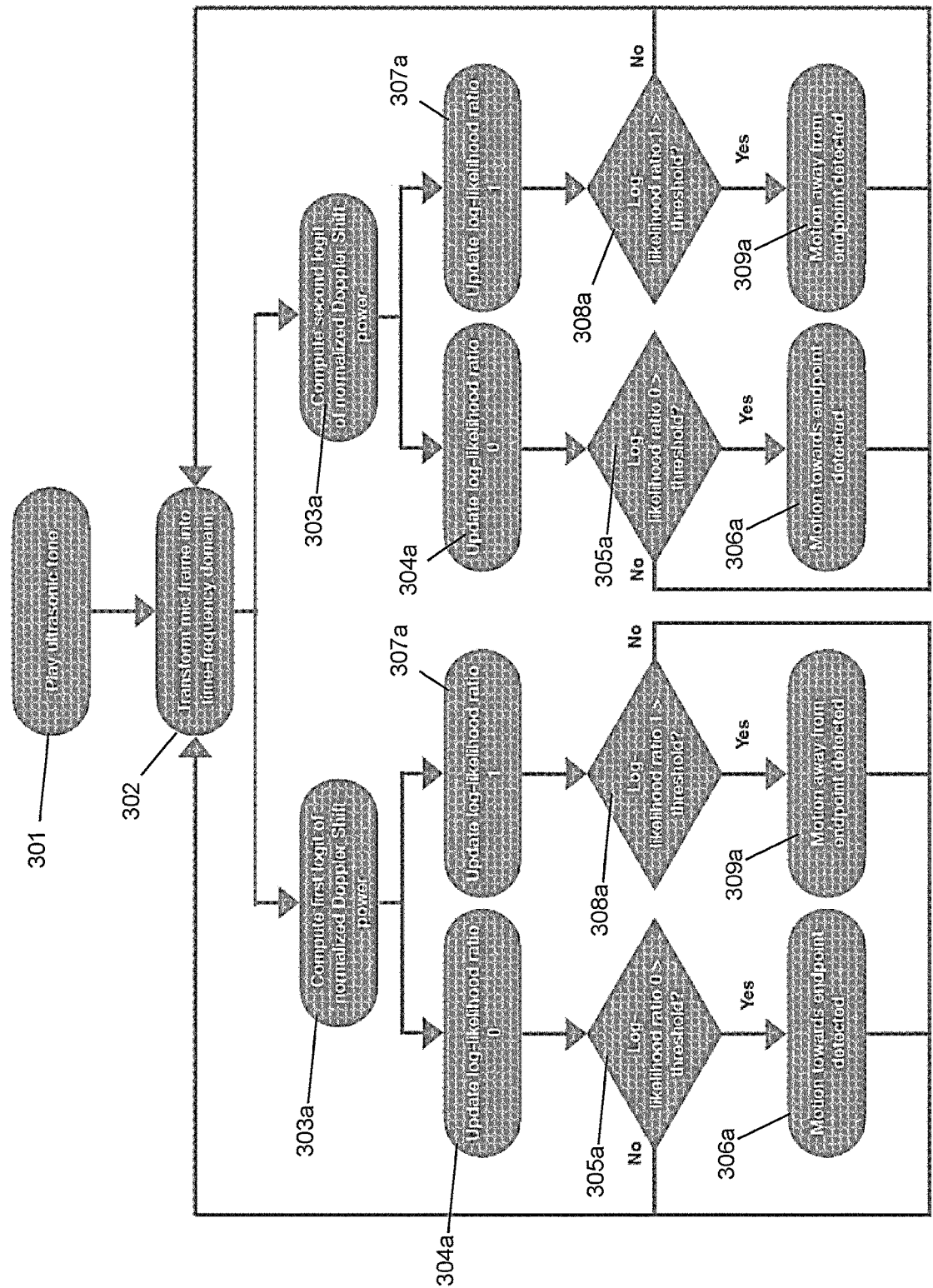

when a wideband signal is received;

FIG. 5 shows a plot of L(t) together with a corresponding histogram when no motion is occurring;

FIG. 6 shows plots of $|X(t, f_0-1)|^2$, $|X(t, f_0+1)|^2$, and L(t) when motion is occurring;

FIG. 7 shows a plot of L(t), and a plot of corresponding log-likelihood ratios, and detection threshold; and FIG. 8 is a flow diagram of a method according to a variant embodiment of the present invention.

DETAILED DESCRIPTION AND FURTHER OPTIONAL FEATURES

Aspects and embodiments of the present invention will now be discussed with reference to the accompanying figures. Further aspects and embodiments will be apparent to those skilled in the art.

Figure 1:
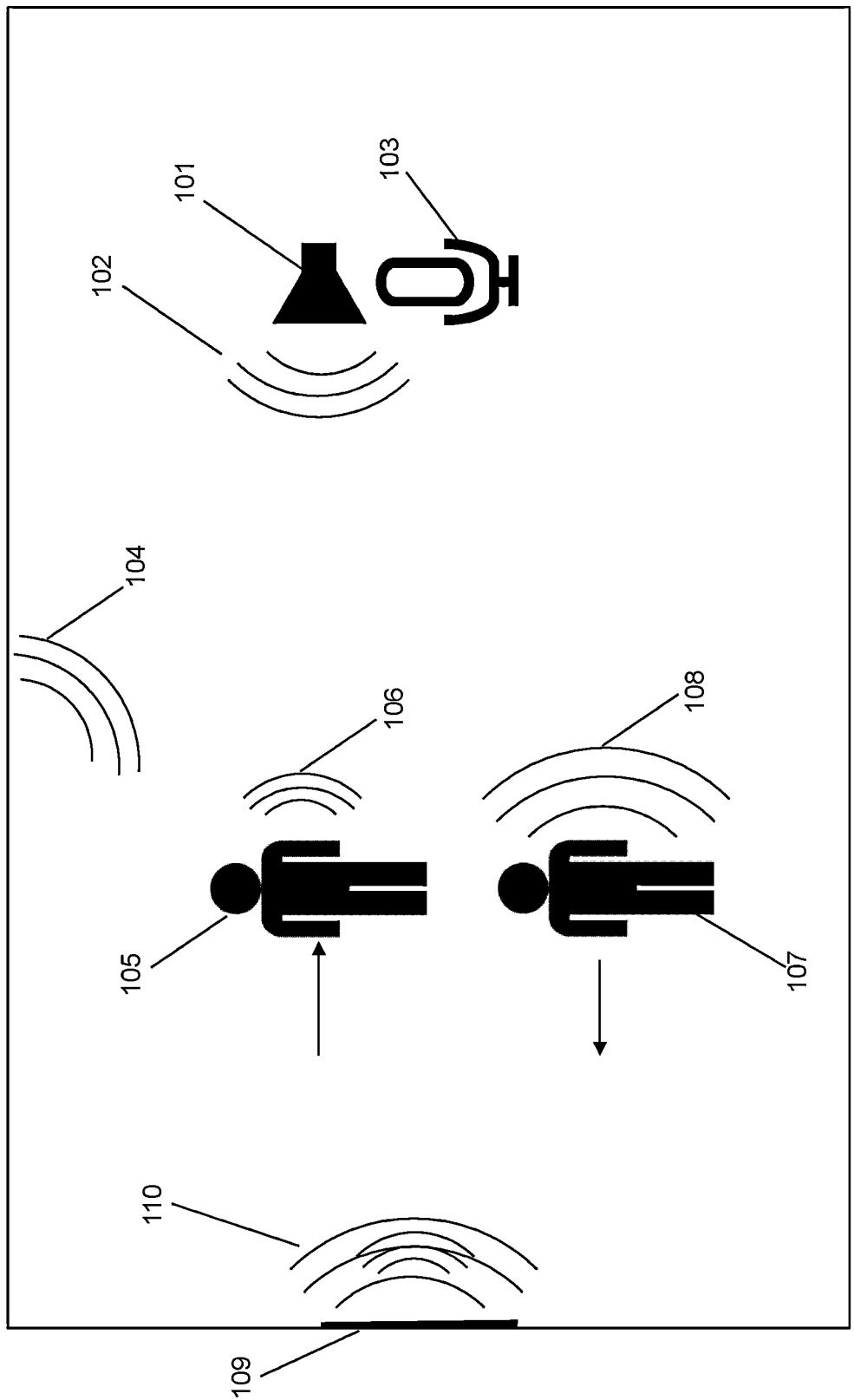
FIG. 1 shows a system according to embodiments of the present invention.

FIG. 1 shows a room including the system of the present invention. The system includes an ultrasonic emitter 101, which emits an ultrasonic signal 102 at a first frequency, $f_0$ (also referred to as a tone). In this example, $f_0$ is 22000 Hz, but it may take any ultrasonic frequency value (e.g. at least 20 kHz and no more than 24 kHz). The emitter continuously emits the tone. In this example, the emitter is a speaker also used in a video conferencing device. The system also includes a receiver 103, in this example a microphone also part of the video conferencing device. The receiver is configured to detect not only the ultrasonic signal at $f_0$ but also reflections of the signal which have been Doppler shifted. The system also includes one or more processors (not shown), which are configured to use the signal received from the receiver 103 to determine if a person is present in the room.

As the ultrasonic signal propagates through the room, it reflects from various objects and/or interfaces. For example, after reflecting from a wall, an un-shifted reflection 104, i.e. one still at $f_0$, is returned to the receiver 103. This un-shifted reflection is ignored, as it provides little information on the presence of people (indicated by movement) within the room. Whereas, after reflecting from person 105, who is moving towards the receiver 103, upshifted reflection 106 is returned to the receiver. The upshifted reflection 106 has a frequency higher than $f_0$. This upshifted reflection provides information relating to the presence of a person within the room, particularly that the person is moving towards the receiver 103. Similarly, after reflecting from person 107, who is moving away from the receiver 103, downshifted reflection 108 is returned to the receiver. The downshifted reflection 108 has a frequency lower than $f_0$. This downshifted reflection also provides information relating to the presence of a person within the room, and particularly that the person is moving away from the receiver 103.

However, as discussed previously, transient noises 110 such as those generated by a door 109 slamming or hands clapping (which may originate from outside of the room) have a relatively broad frequency range and may contain components which have the same or similar frequency to the upshifted or downshifted components. These transient noises, which do not originate from emitter 101, can be interpreted by the receiver (or the processors connect thereto) as indicating the presence of a person.

Figure 2:
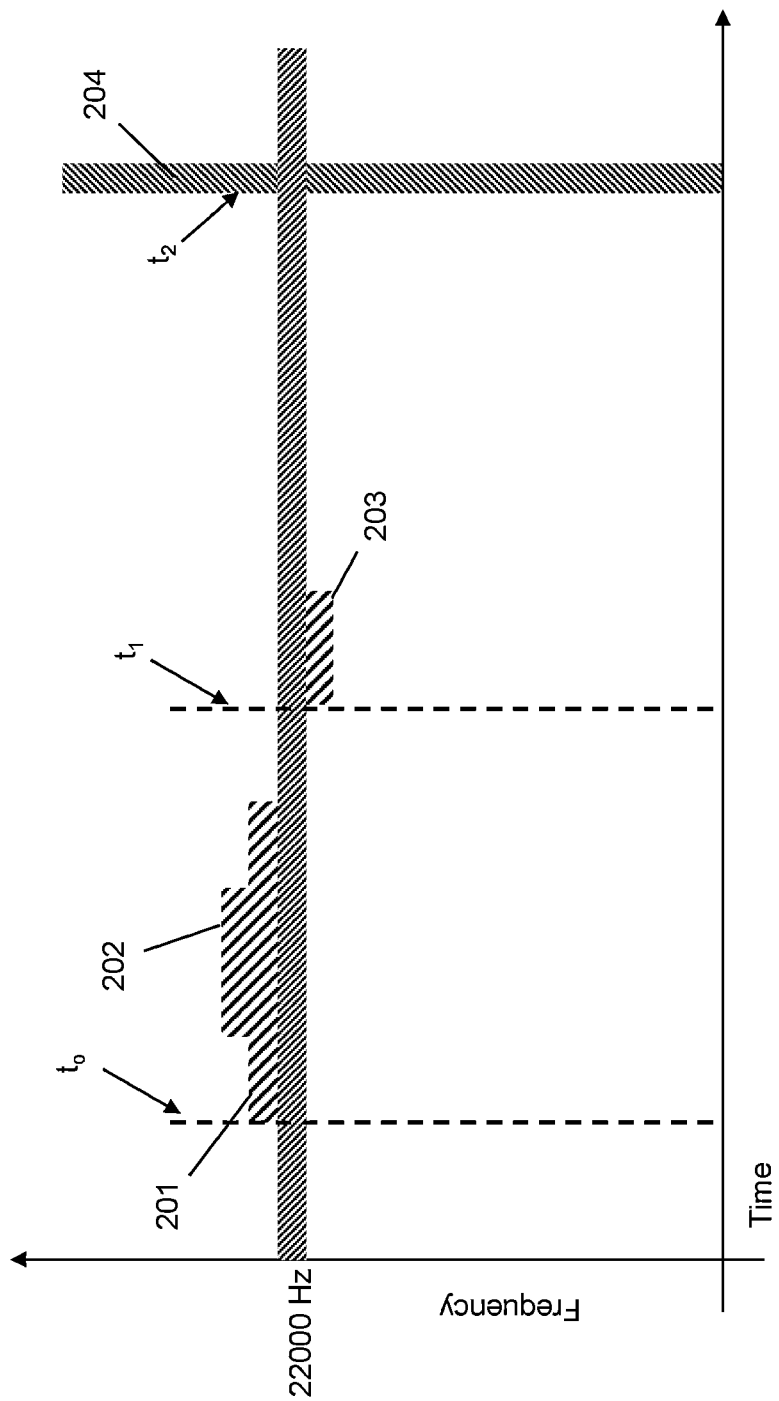
FIG. 2 shows a spectrogram (time-frequency plot) of a point in space near the microphone of the system in FIG. 1.

FIG. 2 is a spectrogram (time-frequency plot) of a region of space near the receiver which illustrates this principle. A tone is emitted by the emitter at 22000 Hz, and so provides a narrow band of signal which extends over a long period of time. At $t_0$, a person walks towards the receiver at a first speed, and so an upshifted signal 201 is received by the receiver. In this example, the person then increases their speed towards the receiver, resulting in a further upshifted signal 202 which is received by the receiver. The person then halts, and no upshifted signal is received. At $t_1$, the person then walks away from the receiver, and so a downshifted signal 203 is received by the receiver.

Next, at time $t_2$, a transient signal 204 is received by the receiver. The signal is transient in that it has a limited presence in the 'x' axis. However, the transient signal includes components at the same frequency as the upshifted signal 201, further upshifted signal 202, and downshifted signal 203. There is a risk then, that a processor connected to the receiver may interpret transient signal 204 as being indicative of a person being present.

Figure 3:
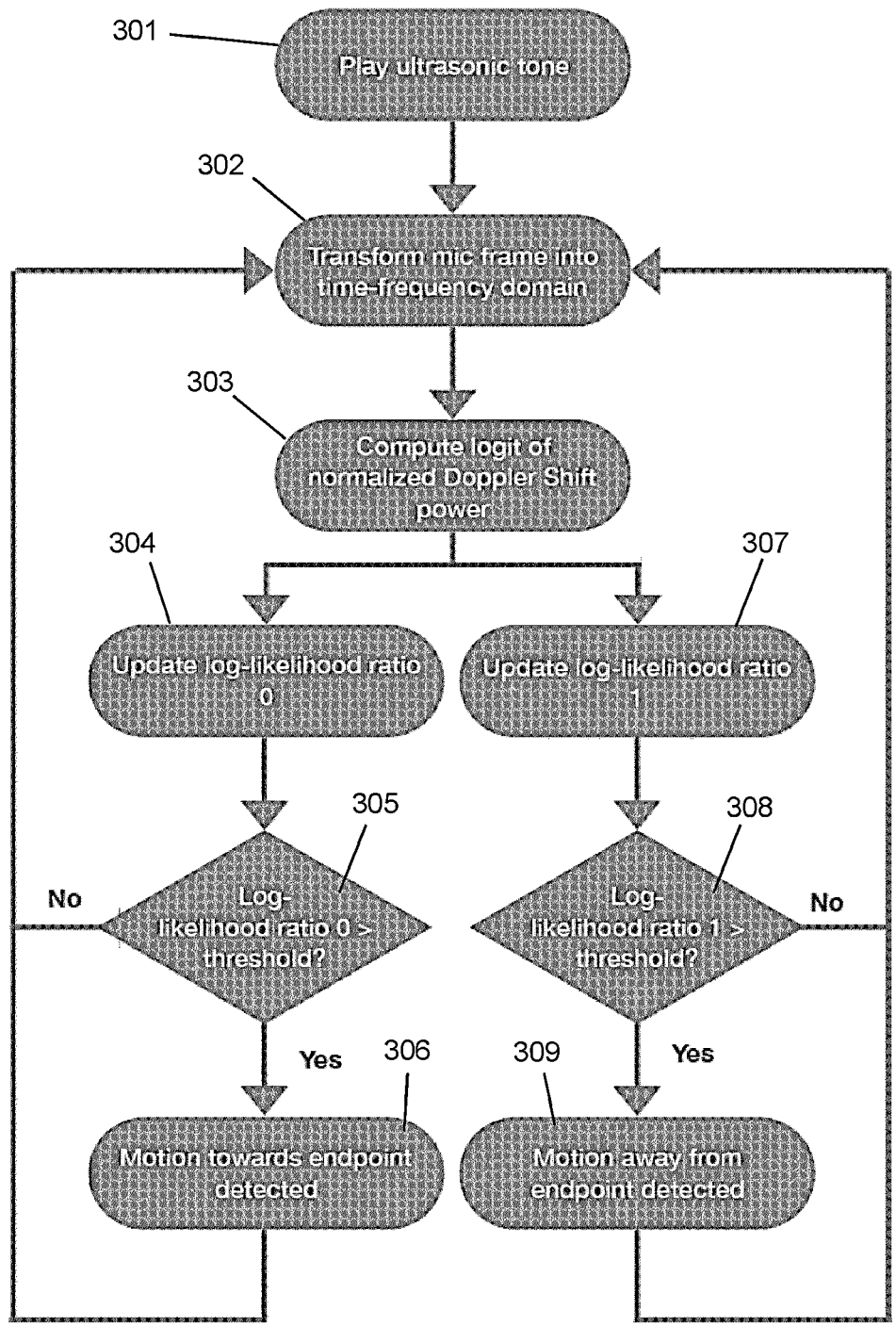
FIG. 3 is a flow diagram of a method according to embodiments of the present invention.

FIG. 3 is a flow diagram of a method according to embodiments of the present invention. In a first step, 301, the ultrasonic tone is emitted at frequency $f_0$. Next, in step 302, the signal received by the one or more receivers is transformed from a microphone frame, i.e. a short time frame of the microphone signal, into the time-frequency domain. This is performed for a short time window or time frame of the received signal (e.g. 20 ms) and the received signal is transformed into the frequency domain with a filter bank. This results in a plurality of coefficients describing a plurality of time-frequency bins denoted as X(t, f), where t is the time frame, and t=0, 1, 2, ..., and f is the frequency bin index and f=0, 1, 2, ..., K−1, and where K is the discrete Fourier transform (DFT) size. The filter bank is designed so that the filters are sharp (with little leakage from neighbouring frequency bins) and with sufficiently narrow bandwidth in order to detect slow walking speed, e.g. 65 Hz.

Next, in step 303, a logit of the normalised Doppler shift power is computed. Let $f_0$ denote the frequency bin index that contains the emitted tone's frequency (e.g. 22000 Hz). The logit of the normalised power of the Doppler shift is then defined as:

$$L(t) = \text{logit}\left(\frac{|X(t, f_0 + 1)|^2}{|X(t, f_0 - 1)|^2 + |X(t, f_0 + 1)|^2}\right)$$

Where |...| denotes the absolute value, and logit $$(p) = \ln\left(\frac{p}{1-p}\right)$$

is the logit function for p. The argument of the logit function, i.e.

$$p = \frac{|X(t, f_0 + 1)|^2}{|X(t, f_0 - 1)|^2 + |X(t, f_0 + 1)|^2}$$

is the normalised power estimate of the frequency bin above $f_0$ and the normalisation factor is the sum of the power estimates of the frequency bins above and below $f_0$.

This means that p is a number between zero and one, and can be likened to a probability. The logit function then transforms this probability such that it can take on values between ±∞.

After this has been calculated for a given time-window, the method moves to steps 304 and 307 which are performed simultaneously. In step 304, a first log-likelihood ratio, log-likelihood ratio 0, is updated based on the computed logit, to indicate how likely it is that there is movement towards the receiver. At the same time, in step 307, a second log-likelihood ratio, log-likelihood ratio 1, is updated based on the computed logit, to indicate how likely it is that there is movement away from the receiver.

In general, likelihood ratios do not have closed form expression, and so it can be computationally expensive to compute one. However, since the values of L(t) have been found to be approximately independent and normally distributed, simple expressions for the log-likelihood ratio can be derived.

Log-likelihood ratios, of the type known per se in the art, have the general expression:

$$LLR_x = \ln\left(\frac{p_{x|h_1}}{p_{x|h_0}}\right)$$

Where $p_{x|h_1}$ is the likelihood of there being motion towards or away from the receiver, and $p_{x|h_0}$ is the likelihood of there being no motion. See, for example, *The CuSum Algorithm—a small review*, Pierre Granjon, the contents of which is incorporated herein by reference.

Further, the log-likelihood ratios can be computed recursively, using the previous value and the new value of L(t). The initialisation of the log-likelihood ratios may include initialising them to zero, meaning that the initial likelihood ratio is one. This means that, at initialisation, the likelihood for motion is the same as the likelihood for no motion. Letting $LLR_0(t)$ denote the log-likelihood ratio of motion towards the receiver and $LLR_1(t)$ denote the log-likelihood ratio of motion away from the receiver, the update equations of the log-likelihood ratios can be specified as:

$$LLR_0(t) = \max\left(LLR_0(t-1) + \left(\frac{\delta}{\text{var}}\right) \times \left(L(t) - \frac{\delta}{2}\right), 0\right)$$

$$LLR_1(t) = \max\left(LLR_1(t-1) - \left(\frac{\delta}{\text{var}}\right) \times \left(L(t) + \frac{\delta}{2}\right), 0\right)$$

In these expressions, δ is the expected change in magnitude, i.e. the expected deviation in the mean of L(t) from zero mean upon motion. This is a constant which is set during an initialisation stage. The variance of L(t) is denoted as var. This is either set to a fixed value during the initialisation stage, or estimated as the values of L(t) are computed.

Once the log-likelihood ratios are calculated using some or all of the information from the computed logit, each log-likelihood ratio is compared to a threshold in steps 305 and 308. If one of the likelihood ratios exceeds its threshold, 'Yes' in steps 305 and/or 308, then motion towards or away from the receiver can be determined in steps 306 and 309 respectively.

Once motion has been detected, or not ('No' in steps 305 and 308) the method returns to step 302 for a new time-window. In this way, the motion detection method can operate continuously. In the example discussed below, the value of δ was selected as 5, and var was estimated from the values of L(t). In one example, an estimate value for var is obtained using the maximum likelihood estimator for L(t) in a time window when it was known that no motion was present. The maximum likelihood estimate can be calculated as the average of $L(t)^2$, for t in the time window when it is known that there is not motion.

The logit function discussed above is particularly well suited for motion detection, for three reasons: (1) transient noise immunity; (2) normally distributed values; and (3) indicative of the direction of motion.

Figure 4:
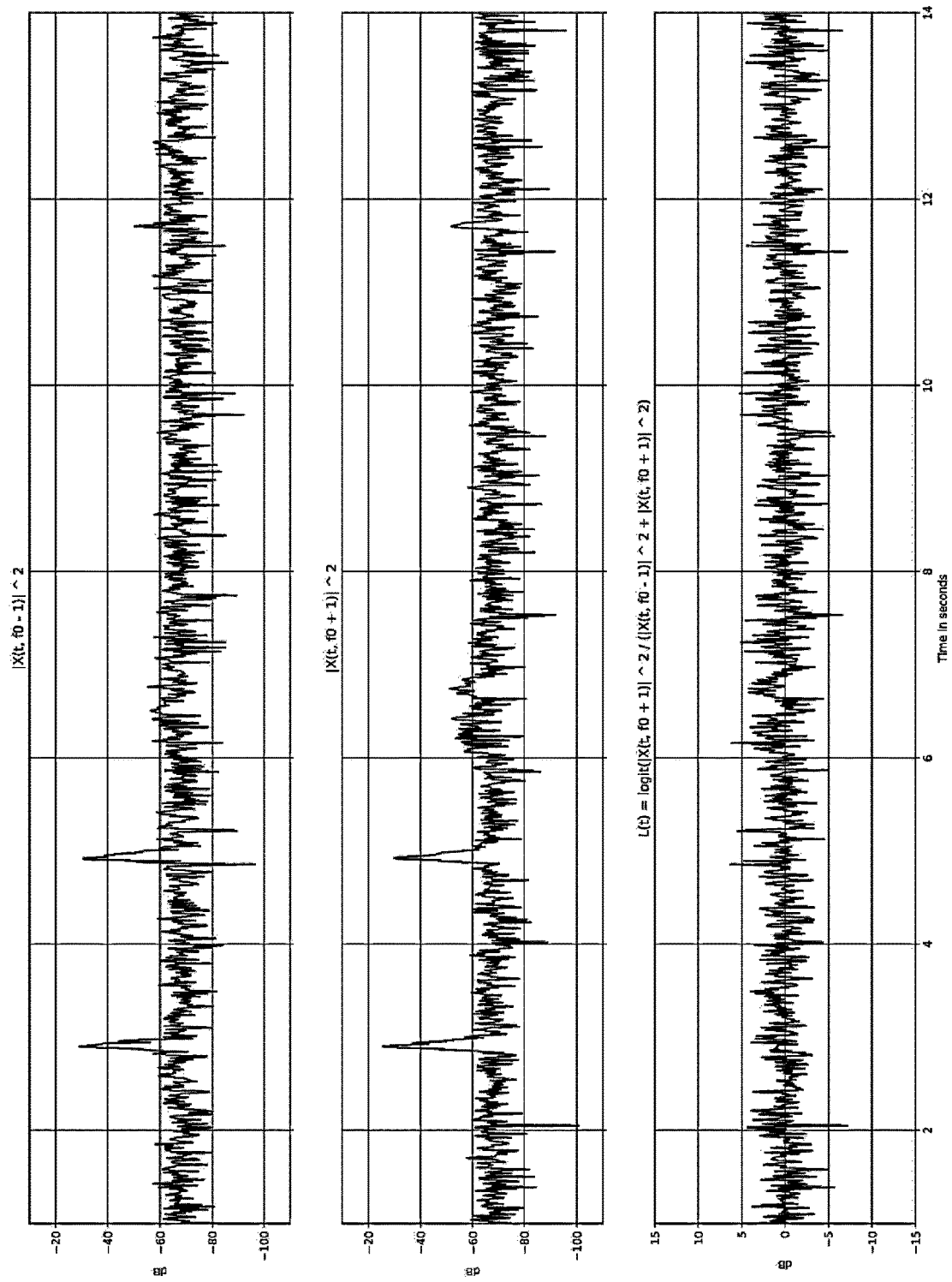
FIG. 4 shows plots of $|X(t, f_0-1)|^2$, $|X(t, f_0+1)|^2$, and $$L(t) = \text{logit}\left(\frac{|X(t, f_0+1)|^2}{|X(t, f_0-1)|^2 + |X(t, f_0+1)|^2}\right)$$

Taking point (1) first, FIG. 4 shows plots of the lower frequency bin $|X(t, f_0-1)|^2$, the upper frequency bin $|X(t, f_0+1)|^2$, and $$L(t) = \text{logit}\left(\frac{|X(t, f_0 + 1)|^2}{|X(t, f_0 - 1)|^2 + |X(t, f_0 + 1)|^2}\right),$$

when a transient, broadband signal is received.

The upper graph in FIG. 4 is a plot of $|X(t, f_0-1)|^2$ against time, and so a plot of the power of the frequency bin immediately below $f_0$. As can be seen by the two peaks, approximately at 3 seconds and 5 seconds, this frequency bin encapsulates components of the transient, broadband noise. The middle graph in FIG. 4 is a plot of $|X(t, f_0+1)|^2$ against time, and so a plot of the power of the frequency bin immediately above $f_0$. Again, two peaks can be seen at approximately 3 and 5 seconds. It can be determined then that the transient, broadband signal adds approximately equally to both the upper and lower portions of the signal.

Thus, as seen in the lower graph in FIG. 4 which is a plot of L(t), the approximately equal contributions in the upper and lower portions of the signal are cancelled out by the ratio in L(t) and so the logit function has noise immunity to transient, broadband, noises or signals.

Turning next to point (2), the normally distributed values, FIG. 5 shows a plot of L(t) together with a corresponding histogram when no motion is occurring. If there is no motion, and hence no Doppler shift, the values of L(t) for t=0, 1, 2, . . . follow a distribution which is similar to the normal distribution. This was validated by experiments, the results of which are shown in the histogram which is the lower plot in FIG. 5. It is also expected that the values of L(t) are almost independent of each other. As was discussed above, because these values are independent of each other and normally distributed, simple expressions for the log-likelihood ratios can be derived.

Next, and with relation to point (3) the detection of motion, FIG. 6 shows plots of $|X(t, f_0-1)|^2$, $|X(t, f_0+1)|^2$, and L(t) when motion is occurring. The values of L(t), t=1, 2, . . . contain information about the direction of motion as has been discussed before. Where there is no motion, L(t) is close to zero. When there is motion towards the receiver, L(t) is generally positive, for example a few decibels above zero. Conversely, when there is motion away from the receiver, L(t) is generally negative, for example a few decibels below zero. The upper plot in FIG. 6 is a plot of the frequency bin below the frequency containing $f_0$, and shows between 6 and 10 seconds that a person is walking away from the receiver through an increase in amplitude. The middle plot in FIG. 6 is a plot of the frequency bin above the frequency bin containing $f_0$, and shows between 4 and 6 seconds that a person is walking towards the receiver through an increase in amplitude. The lower plot is a plot of the logit function L(t), and shows that it takes positive values between 4 and 6 seconds, and negative values between 6 and 10 seconds, which demonstrates that L(t) can be used to determine the direction of motion relative to the receiver.

FIG. 7 shows a plot of L(t), and a plot of corresponding log-likelihood ratios, and detection threshold. The upper plot in FIG. 7 is of L(t) and corresponds to the lower plot in FIG. 6. The lower plot in FIG. 7 is a plot of the log-likelihood ratios, and detection threshold for detecting that there is motion towards or away from the receiver. Line 701 shows the value of $LLR_0(t)$ discussed above, and line 702 shows the value of $LLR_1(t)$ discussed above. Dashed lined 703 is the threshold, taken in this example to be 100.

As can be seen, line 701 rises above threshold 703 between 4 and 5 seconds, and gives an indication that there is motion towards the receiver. At around 7 seconds, line 702 rises above the threshold 703 whilst line 701 falls below it, and gives an indication that there is motion away from the receiver.

FIG. 8 is a flow diagram of a variant method according to embodiments of the present invention. Where it shares features with the flow diagram shown in FIG. 3, like features are indicated by like reference numerals. In contrast to the method shown in FIG. 3, the method of FIG. 8 utilises two logit functions. A first logit function, $L_1(t)$, which is tuned to better detect motion towards the video system, and a second logit function, $L_2(t)$, which is tuned to better detect motion away from the video system.

The logit function discussed with respect to FIG. 3 can be improved based on the following observations. During motion towards a video conferencing device in a room reflections from the moving object will cause a higher received frequency. However, a reflection hitting a back wall, then the moving object, and then the back wall again before being received by the receiver in the video conferencing device will have a lower received frequency. It is noted then that the received frequencies constitute a range of Doppler shifts. With motion towards the video conferencing device, most of these Doppler shifts will be of a higher frequency, but some will be of a lower frequency.

Accordingly, $L_1(t)$ can be formulated as:

$$L_1(t) = \text{logit}\left(\frac{|X(t, f_0+1)|^2}{|X(t, f_0-3)|^2 + |X(t, f_0+1)|^2}\right)$$

i.e. replacing $X(t, f_0-1)$ in L(t) with $X(t, f_0-3)$. This results in a more robust signal for detection of motion towards the video conferencing device, since with normal walking speeds few Doppler shifts are received as low as $f_0-3$. Further, noise immunity is still good, as broadband noises such as a door slamming or hands clapping have a very similar amount of energy in both frequency bins $f_0-3$ and $f_0+1$. However, logit function $L_1(t)$ does not perform as well when motion is directed away from the video conferencing device. Therefore the second logit function, $L_2(t)$, is employed which is formulated as:

$$L_2(t) = \text{logit}\left(\frac{|X(t, f_0-1)|^2}{|X(t, f_0+3)|^2 + |X(t, f_0+1)|^2}\right)$$

This is shown in Steps 303a-309a and 303b-309b for both logit functions, which are executed in parallel.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An ultrasonic-based person detection method, comprising:
   (a) emitting, from an emitter, an ultrasonic signal, the ultrasonic signal including a component at a first frequency, $f_0$;
   (b) receiving a reflected signal generated from reflections of the ultrasonic signal, the reflected signal including components at frequencies greater than and less than the first frequency, including an upper portion of the reflected signal containing a frequency higher than the first frequency and a lower portion of the reflected signal containing a frequency lower than the first frequency;
   (c) determining a difference between the upper portion of the reflected signal containing the frequency higher than the first frequency, and the lower portion of the reflected signal containing the frequency lower than the first frequency; and
   (d) determining, based on the difference between the upper portion and the lower portion, whether a person is present.

2. The method of claim 1, wherein the upper portion of the reflected signal contains higher frequencies immediately adjacent to the first frequency, and the lower portion of the reflected signal contains lower frequencies immediately adjacent to the first frequency.

3. The method of claim 1, wherein the method includes dividing the reflected signal into a plurality of bins, each bin representing a range of frequencies in the reflected signal, and wherein the upper portion is an upper frequency bin, containing portions of the reflected signal which are higher in frequency than the first frequency, and the lower portion is a lower frequency bin, containing portions of the reflected signal which are lower in frequency than the first frequency.

4. The method of claim 3, wherein the determination is performed based on a difference between a normalised power estimate of the upper frequency bin and a normalised power estimate of the lower frequency bin.

5. The method of claim 4, wherein a normalisation factor is a sum of the power estimates of the upper frequency bin and the lower frequency bin.

6. The method of claim 3, wherein determining whether the person is present includes determining a logit function of a normalised power estimate of the upper frequency bin.

7. The method of claim 6, wherein the logit function takes a form:

$$L(t) = \text{logit}\left(\frac{|X(t, f_0 + 1)|^2}{|X(t, f_0 - 1)|^2 + |X(t, f_0 + 1)|^2}\right)$$

where $X(t, f_0+1)$ is a coefficient representing the upper frequency bin at time t, and $X(t, f_0-1)$ is a coefficient representing the lower frequency bin at time t.

8. The method of claim 1, wherein steps (b)-(d) are repeated at a predetermined rate.

9. The method of claim 1, further comprising, after it has been determined that a person is present, determining whether the person is moving towards or away from a receiver receiving the reflected signal.

10. The method of claim 9, wherein determining whether the person is moving towards or away from the receiver is further based on a first likelihood ratio test, for determining whether the person is moving towards the receiver; and a second likelihood ratio test, for determining whether the person is moving away from the receiver.

11. The method of claim 10, wherein a log-likelihood ratio is derived for each likelihood ratio, and is computed recursively from a previous value of the respective log-likelihood ratio.

12. The method of claim 1, wherein when it has been determined that a person is present, the method includes taking a video conferencing device out of standby mode.

13. A system for detecting a person, the system including:
an emitter, configured to emit an ultrasonic signal including a component at a first frequency, $f_0$;
one or more receivers, configured to receive a reflected signal generated from reflections of the ultrasonic signal; and
one or more processors, configured, in response to the one or more receivers receiving the reflected signal, the reflected signal including components at frequencies greater than and less than the first frequency, including an upper portion of the reflected signal containing a frequency higher than the first frequency and a lower portion of the reflected signal containing a frequency lower than the first frequency, to:
(a) determine a difference between the upper portion of the reflected signal containing the frequency higher than the first frequency, and the lower portion of the reflected signal containing the frequency lower than the first frequency; and
(b) determine, based on the difference between the upper portion and the lower portion, whether a person is present.

14. The system of claim 13, wherein the upper portion of the reflected signal contains higher frequencies immediately adjacent to the first frequency, and the lower portion of the reflected signal contains lower frequencies immediately adjacent to the first frequency.

15. The system of claim 13, wherein the processor(s) are further configured to divide the reflected signal into a plurality of bins, each bin representing a range of frequencies in the reflected signal, and wherein the upper portion is an upper frequency bin, containing portions of the reflected signal which are higher in frequency than the first frequency, and the lower portion is a lower frequency bin, containing portions of the reflected signal which are lower in frequency than the first frequency.

16. The system of claim 15, wherein the determination is performed based on a difference between a normalised power estimate of the upper frequency bin and a normalised power estimate of the lower frequency bin.

17. The system of claim 16, wherein a normalisation factor is a sum of the power estimates of the upper frequency bin and the lower frequency bin.

18. The system of claim 15, wherein determining whether the person is present includes determining a logit function of a normalised power estimate of the upper frequency bin.

\* \* \* \* \*